(12) United States Patent
Dellock et al.

(10) Patent No.: US 9,688,215 B1
(45) Date of Patent: Jun. 27, 2017

(54) IRIDESCENT VEHICLE APPLIQUE

(71) Applicant: Ford Global Technologies, LLC, Dearborn, MI (US)

(72) Inventors: Paul Kenneth Dellock, Northville, MI (US); Talat Karmo, Waterford, MI (US); Stuart C. Salter, White Lake, MI (US); Michael Musleh, Canton, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/152,095

(22) Filed: May 11, 2016

(51) Int. Cl.
| | |
|---|---|
| *B44C 1/165* | (2006.01) |
| *B44C 5/00* | (2006.01) |
| *B60R 13/00* | (2006.01) |
| *B44C 3/02* | (2006.01) |
| *B44C 1/18* | (2006.01) |
| *B44C 5/04* | (2006.01) |
| *B44F 11/02* | (2006.01) |
| *B44F 1/14* | (2006.01) |
| *B29C 45/37* | (2006.01) |
| *B29C 45/16* | (2006.01) |
| *B29C 33/38* | (2006.01) |
| *B29K 83/00* | (2006.01) |
| *B29L 31/30* | (2006.01) |
| *B29K 105/00* | (2006.01) |
| *B29L 31/00* | (2006.01) |

(52) U.S. Cl.
CPC .......... *B60R 13/005* (2013.01); *B29C 45/372* (2013.01); *B44C 1/18* (2013.01); *B44C 3/025* (2013.01); *B44C 5/0446* (2013.01); *B44F 1/14* (2013.01); *B44F 11/02* (2013.01); *B29C 33/3842* (2013.01); *B29C 45/16* (2013.01); *B29K 2083/005* (2013.01); *B29K 2105/0094* (2013.01); *B29K 2905/00* (2013.01); *B29K 2995/0018* (2013.01); *B29L 2031/3005* (2013.01); *B29L 2031/722* (2013.01); *Y10S 428/914* (2013.01)

(58) Field of Classification Search
CPC ....... B60R 13/005; B44C 1/1704; B44C 1/18; B44C 3/025; B44C 3/18; B44C 5/0446; B44F 1/14; B29L 2031/3005; B29L 2031/722; Y10S 428/914; Y10S 428/915
USPC .................................. 428/914, 915
See application file for complete search history.

(56) References Cited

U.S. PATENT DOCUMENTS

| | | |
|---|---|---|
| 5,053,930 A | 10/1991 | Benavides |
| 5,709,453 A | 1/1998 | Krent et al. |
| | (Continued) | |

FOREIGN PATENT DOCUMENTS

| | | |
|---|---|---|
| CN | 1042928 A | 6/1990 |
| CN | 101337492 A | 1/2009 |
| | (Continued) | |

*Primary Examiner* — Bruce H Hess
(74) *Attorney, Agent, or Firm* — Jason Rogers; Price Heneveld LLP

(57) ABSTRACT

A vehicle is provided that includes a vehicle surface and a vehicle applique in direct contact with the vehicle surface. The applique includes a polymeric substrate and an over-mold positioned on the substrate. The over-mold comprises a diffraction grating integral with the over-mold, the grating having a thickness from about 250 nm to 1000 nm and a period from 50 nm to 5 microns.

20 Claims, 4 Drawing Sheets

(56) References Cited

U.S. PATENT DOCUMENTS

| | | |
|---|---|---|
| 5,718,950 A | 2/1998 | Komatsu et al. |
| 5,839,718 A | 11/1998 | Hase et al. |
| 6,031,511 A | 2/2000 | DeLuca et al. |
| 6,117,362 A | 9/2000 | Yen et al. |
| 6,129,975 A * | 10/2000 | Curiel .................. G09F 3/0292 156/220 |
| 6,383,613 B1 | 5/2002 | Takeda |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,761,959 B1 | 7/2004 | Bonkowski et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,667,895 B2 | 2/2010 | Argoitia et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0299796 A1 | 11/2013 | Masuyama et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0236613 A1 | 8/2016 | Trier |

FOREIGN PATENT DOCUMENTS

| | | |
|---|---|---|
| CN | 201169230 Y | 2/2009 |
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |

* cited by examiner

IRIDESCENT VEHICLE APPLIQUE

FIELD OF THE INVENTION

The present invention generally relates to vehicle appliques, and more particularly relates to vehicle appliques having iridescent features.

BACKGROUND OF THE INVENTION

Car enthusiasts and owners of luxury and high-end vehicles are continually demanding new aesthetics that justify, at least in part, the cost of such vehicles. Vehicle applique can be designed to reflect the luxury and high-end nature of particular vehicle models.

SUMMARY OF THE INVENTION

According to one aspect of the present invention, a vehicle is provided that includes a vehicle surface and a vehicle applique in direct contact with the vehicle surface. The applique includes a polymeric substrate and an over-mold positioned on the substrate. The over-mold comprises a diffraction grating integral with the over-mold, the grating having a thickness from about 250 nm to 1000 nm and a period from 50 nm to 5 microns.

According to another aspect of the present invention, an iridescent vehicle applique is provided that includes a polymeric substrate and a translucent over-mold positioned over the substrate defining an exterior surface. The over-mold contains silicone and defines at least one diffraction grating integrally defined on the exterior surface of the over-mold.

According to another aspect of the present invention, a method of making an iridescent vehicular applique is provided that includes forming a mold with mold surfaces, ablating at least one of the mold surfaces to form a diffraction grating mold surface, forming a substrate within the mold, and over-molding a liquid polymer over the substrate. The liquid polymer penetrates the diffraction grating.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
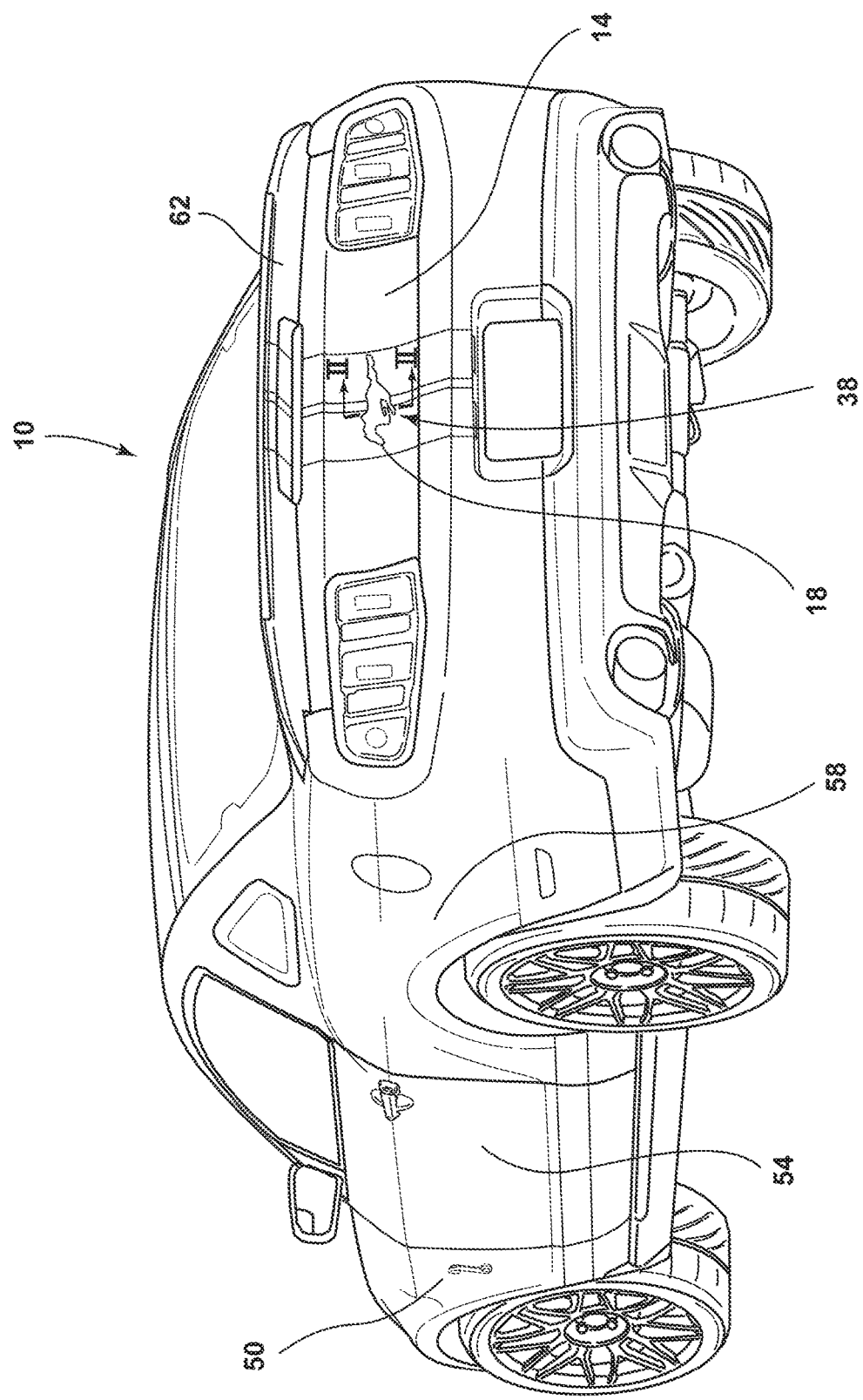
FIG. 1 is a top rear perspective view of a vehicle having an applique, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements, does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1-3C, reference numeral 10 generally designates a vehicle, such as a wheeled motor vehicle. The vehicle 10 includes an outer surface 14 and an applique 18. The applique 18 may be positioned on the vehicle 10 and in direct contact with the vehicle outer surface 14. The applique 18 may include a substrate 22 and an over-mold 26 positioned on the substrate 22. The over-mold 26 defines a diffraction grating 30 on an exterior surface 34 thereof. The over-mold 26 may define an inner surface 36 proximate the substrate 22. The diffraction grating 30 may form one or more indicia 38.

Referring now to FIG. 1, the outer surface 14 of the vehicle 10 may be formed by one or more exterior panels and lids. For example, the vehicle 10 may include a front quarter panel 50, a door panel 54, a rear quarter panel 58 and a trunk lid 62. Each of the quarter panels 50, 58, the door panel 54 and trunk lid 62 may include the applique 18. The applique 18 may designate a make or model of the vehicle 10, as well as other features about the vehicle 10 (e.g., sport edition, luxury edition, etc.) or simply be applied for aesthetic concerns. For example, the indicia 38 may include text, numbers and/or symbols configured to convey information about the vehicle 10. Although depicted on the quarter panels 50, 58, the door panel 54 and trunk lid 62, the applique 18 may be positioned at a plurality of locations on the vehicle 10 (e.g., roof, hood, A-pillar, B-pillar, C-pillar, windows, windshield, fenders, grill, bumpers and/or interior spaces) without departing from the spirit of the disclosure.

Figure 2:
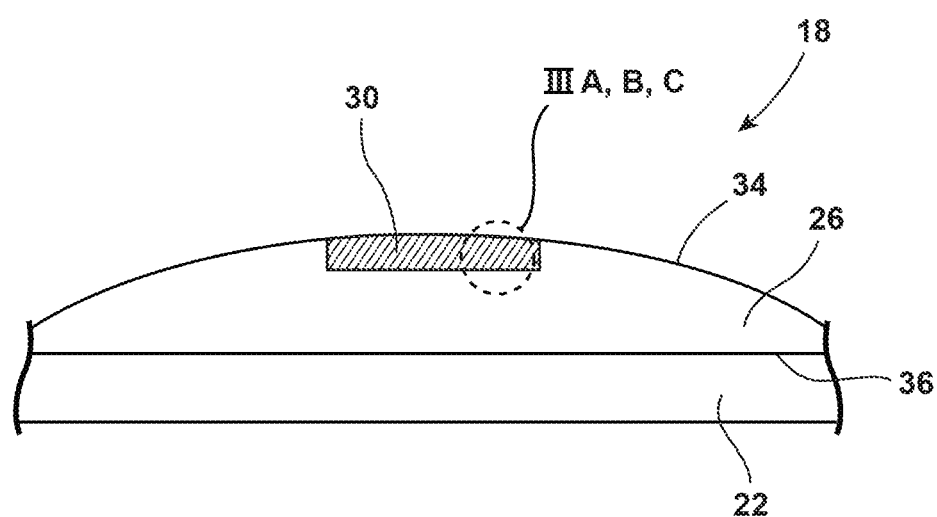
FIG. 2 is a cross-sectional view taken through line II-II of the applique of FIG. 1.

Referring now to FIG. 2, the applique 18 is positioned directly on the outer surface 14 (FIG. 1) of the vehicle 10. In the depicted example, the over-mold 26 extends substantially around the substrate 22, but does not extend between the substrate 22 and the outer surface 14. However, it will be understood that in other examples, the over-mold 26 may completely surround the substrate 22. The substrate 22 may be a polymeric, metallic, or ceramic material. In polymeric examples, the substrate 22 may include acrylic, acrylonitrile butadiene styrene, nylon, polylactic acid, polycarbonate, polyether sulfone, polyethylene, polypropylene, polyvinyl chloride, other thermoplastic materials, thermoset materials and combinations thereof. The substrate 22 may be positioned directly on the outer surface 14 of the vehicle 10 via an adhesive, integral molding and/or other methods known to bond the substrate 22 to the outer surface 14 of the vehicle 10.

In some examples, the substrate 22 may be prepared by dispersing one or more persistent phosphorescent materials in a polymer matrix to form a homogenous mixture using a variety of methods. For example, the substrate 22 may be rendered by dispersing the phosphorescent materials into a solid state solution (homogenous mixture in a dry state) that may be incorporated in a polymer matrix formed by extrusion, injection molding, compression molding, calendaring, thermoforming, etc. Additionally or alternatively, a phosphorescent film may be disposed on top of the substrate 22 and/or on the inner surface 36 of the over-mold 26 which includes a persistent phosphorescent material. In layer examples, phosphorescent materials can be applied via painting, screen printing, flexography, spraying, slot coating, dip coating, roller coating, bar coating, and/or any other methods known in the art.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent material drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one example, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun) and/or any other light source disposed onboard or exterior to the vehicle 10. The periodic absorption of the activation emission from the excitation sources may provide for a substantially sustained charge of the persistent phosphorescent materials to provide for a consistent passive illumination. In some embodiments, a light sensor may monitor the light illumination intensity of the phosphorescent material and initiate an excitation source (e.g., light from the vehicle 10) when the illumination intensity falls below 0.32 mcd/m$^2$, or any other predefined intensity level.

The persistent phosphorescent materials may correspond to alkaline earth aluminates and silicates, for example, doped di-silicates, or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. The polymeric material of the substrate 22 may include between about 0.1% to about 25.0% of the persistent phosphorescent material either by weight or mole fraction. In embodiments utilizing the phosphorescent film on the substrate 22, the film may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof therefrom. The light emitted from the phosphorescent material, and, thereby, the applique 18, may be of a desired brightness such that the applique 18 is visible. According to one example, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate example, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane may be blended to yield a low rare earth mineral phosphorescent film or be used in the substrate 22. It will be understood that the compositions provided herein are non-limiting examples. Thus, any phosphor known in the art may be utilized as a phosphorescent material or structure without departing from the teachings provided herein. Moreover, it is contemplated that any long persistent phosphor known in the art may also be utilized without departing from the teachings provided herein.

According to yet another example, the substrate 22 may include a plurality of phosphorescent materials configured to emit a plurality of different colored lights. The different colored emissions allow for a wide variety of colors to be generated (e.g., via color mixing). Additionally, the different colored emissions may be separated via the diffraction gratings 30, as explained in greater detail below. Such separation may provide an iridescent appearance.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the substrate 22 or phosphorescent film may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute or no human perceivable persistence).

The over-mold 26 may include optically transparent or translucent polymeric materials such as silicone, polyethylene terepthlate, polystyrene, styrene-acrylonitrile, styrene methyl methacrylate, polycarbonate and combinations thereof. The over-mold 26 may be characterized by an optical transmissivity of 85% or more over the visible spectrum (e.g., 390 to 700 nm). Preferably, the over-mold 26 is characterized by an optical transmissivity of greater than about 90%, or greater than about 95% or more, over the visible spectrum. Further, the over-mold 26 can be optically clear with no substantial coloration. In other embodiments, the over-mold 26 can be tinted or affixed with one or more filters on its exterior surface 34 and/or interior surface 36 to obtain a desired hue (e.g., blue, red, green, etc.). The over-mold 26 may have a thickness, or greatest diameter, of between about 0.1 mm and about 5 mm, or between about 1 mm and about 3 mm.

Still referring to FIG. 2, the exterior surface 34 of the over-mold 26 may have a generally curved shape, as depicted, or may have a square, rectangular, polygonal, undulating, or other complex shape. For example, in some examples, one or more of the exterior and interior surfaces 34, 36 of the over-mold 26 (e.g., faceted), non-planar, curved or characterized by other shapes. As also understood by those with ordinary skill in the field, the exterior and interior surfaces 34, 36 can be characterized with portions having planar features and portions having non-planar features. As shown in FIG. 2, for example, over-mold 26 curved exterior surface 34 defining diffraction gratings 30 as viewed in cross-section, while having some curved portions in forming the overall design of the applique.

Figure 3A:
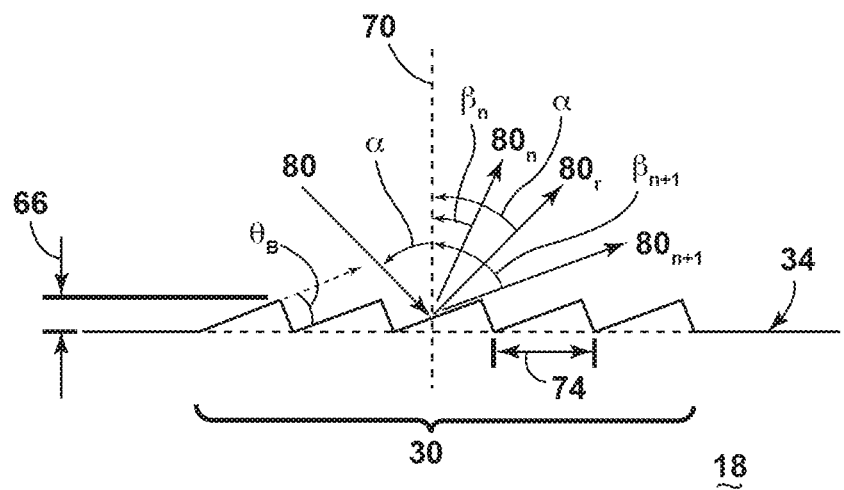
FIG. 3A is an enhanced view of section IIIA of FIG. 2.
Figure 3B:
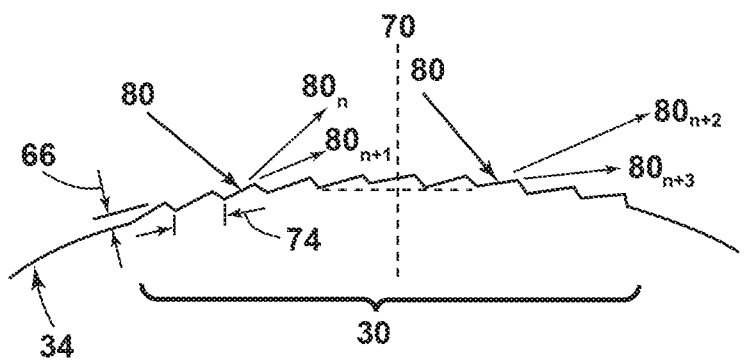
FIG. 3B is an enhanced view of section IIIB of FIG. 2.

Referring now to FIGS. 3A and 3B, the diffraction grating 30 is configured to produce an iridescent pattern to light impinging upon it. The diffraction grating 30 may be present on a flat exterior surface 34 (FIG. 3A) on a curved exterior surface 34 (FIG. 3B), or on other shapes of the exterior surface 34. For example, the diffraction grating 30 may be configured to reflect light of different wavelengths in different directions. The diffraction grating 30 may have a thickness 66 that ranges from about 250 nm to about 1000 nm. The thickness 66 of the diffraction grating 30, for example, should be maintained in the range of about 250 nm to about 1000 nm to ensure that the applique exhibits a jewel-like appearance through light diffraction upon illumination in direct ambient lighting while also having a minimal effect on the optical clarity of the applique under non-direct ambient lighting. Preferably, the thickness 66 of the diffraction grating 30 ranges from about 390 nm to 700 nm. In other embodiments, the thickness 66 of the diffraction gratings 30 ranges from 500 nm to 750 nm. As depicted in FIG. 3A in exemplary form, the diffraction grating 30 may have a sawtooth or triangular shape. In three dimensions, these gratings 30 can appear with a stepped or sawtooth shape without angular features, pyramidal in shape, or some combination of stepped and pyramidal shapes. Other shapes of the diffraction grating 30 include hill-shaped features (e.g., sinusoidal or curved shaped features). The diffraction grating 30 can also include portions with a combination of triangular and hill-shaped features. More generally, the shapes of the grating 30 should be such that an effective blazing angle $\theta_B$ of at least 15 degrees is present for one or more portions of each grating, tooth or groove of the diffraction grating 30. The blaze angle $\theta_B$ is the angle between step normal (i.e., the direction normal to each step or tooth of the grating 30) and the direction normal 70 to the exterior surfaces 34 having the grating 30.

Generally, the blaze angle $\theta_B$ is optimized to maximize the efficiency of the wavelength(s) of the incident light, typically ambient sunlight or light from the phosphorescent material, to ensure that maximum optical power is concentrated in one or more diffraction orders while minimizing residual power in other orders (e.g., the zeroth order indicative of the ambient light itself). An advantage of situating the diffraction gratings 30 on planar portions or aspects of the exterior and interior surfaces 34, 36 (FIG. 2) is that a constant blaze angle $\theta_B$ and a period 74 will result in consistent reflected and diffracted light produced from the diffraction grating.

The diffraction grating 30 of the applique 18 may be characterized by one or more periods 74 (also known as d in the standard nomenclature of diffraction gratings). In most aspects of the applique 18, the period 74 of the diffraction grating 30 is maintained between about 50 nm and about 5 microns. In general, the maximum wavelength that a given diffraction grating 30 can diffract is equal to about twice the period 74. Hence, a diffraction grating 30 with a period 74 that is maintained between about 50 nm and about 5 microns can diffract light in an optical range of 100 nm to about 10 microns. In a preferred embodiment, the period 74 of a diffraction grating 30 is maintained from about 150 nm to about 400 nm, ensuring that the diffraction grating 30 can efficiently diffract light in an optical range of about 300 nm to about 800 nm, roughly covering the visible spectrum.

Incident light 80 (typically ambient, sun light and the phosphorescent light) at an incident angle $\alpha$ is directed against a sawtooth-shaped diffraction grating 30 having a thickness 66, a period 74 and a blaze angle $\theta_B$. More particularly, a portion of the incident light 80 (preferably, a small portion) striking the diffraction grating 30 at an incident angle $\alpha$ is reflected as reflected light 80r at the same angle $\alpha$, and the remaining portion of the incident light 80 is diffracted at particular wavelengths corresponding to diffracted light 80n, 80n+1, etc., at corresponding diffraction angles $\beta n$, $\beta n+1$, etc. The reflected light 80r is indicative of the zeroth order (i.e., n=0) and the diffracted light 80n, 80n+1, 80n+2 are indicative of the nth order diffraction according to standard diffraction grating terminology, where n is an integer corresponding to particular wavelengths of the reflected or diffracted light.

Figure 3C:
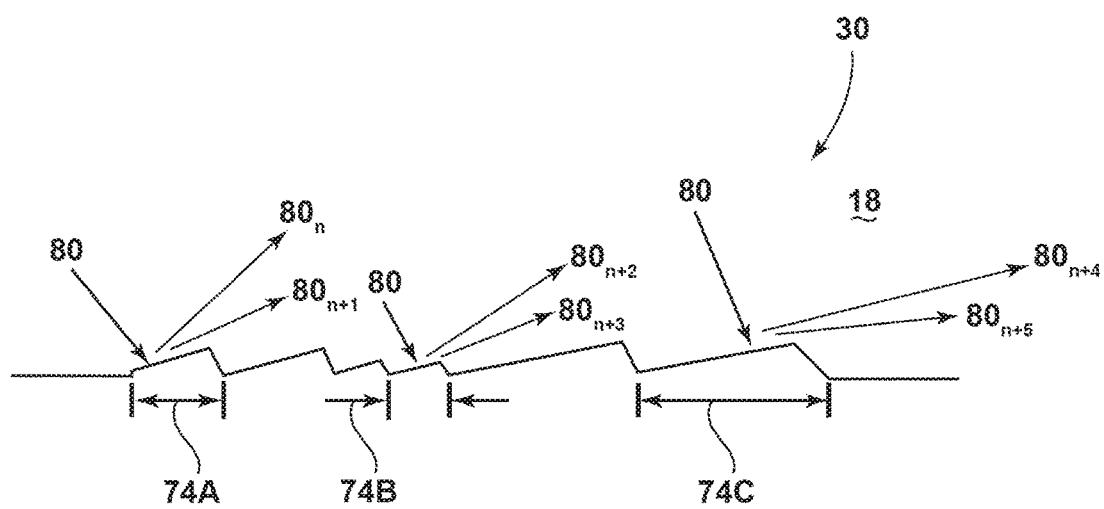
FIG. 3C is an enhanced view of section IIIC of FIG. 2.

Referring now to FIG. 3C, an example of the diffraction grating 30 employing varying periods (e.g., as including a set of periods) that can be employed in iridescent appliques 18 depicted in a cross-sectional form, according to an aspect of the disclosure. In the depicted example, the diffraction grating 30 can have two or more sets of teeth or grooves, each having a particular period 74 that can produce light at unique or differing diffraction orders. As shown, the grating 30 is configured with three periods—period 74A, period 74B, and period 74C. One set of teeth of the diffraction grating 30 with a period of 74A can produce diffracted light 80n and 80n+1, a different set of teeth with a period of 74B can produce diffracted light 80n+2 and 80n+3, and a third set of teeth with a period of 74C can produce diffracted light 80n+4 and 80n+5, all from the same incident light 80. Consequently, the diffraction grating 30, whether employed on interior and/or exterior surfaces 34, 36 (FIG. 2) of the applique 18, (FIG. 2) advantageously can produce jewel-like effects of widely varying wavelengths within various regions of the applique 18.

In some aspects, the diffraction grating 30 includes a varying period that varies between two to ten discrete values or, more preferably, between two to five discrete values across the diffraction grating 30. According to another aspect, the diffraction grating 30 with varying periods can be employed in one or more portions of an interior and/or exterior surface 34, 36 of the applique 18, and one or more diffraction gratings 30 having a constant period are employed in other portions of the exterior and/or interior surface 34, 36 of the applique 18 to create interesting, jewel-like appearance effects produced by the applique 18 employing the gratings. In another example, the diffraction grating 30 includes a varying period that changes between any number of values, only limited by the overall length of the grating 30 and/or the processing capabilities to develop such variability through precise control of mold dimensions. In another embodiment there may be a plurality of diffractions gratings 30 in a spaced apart configuration across the exterior and/or interior surface 34, 36 of the applique 18. In such an embodiment, the plurality of diffraction gratings 30 may have the same or a different period. In yet another embodiment, the diffraction grating(s) 30 may substantially cover the exterior and/or interior surface 34, 36 of the applique 18.

In some examples, optional coatings may be applied over the exterior surface 34 of the over-mold 26. For example, an optically clear sealing layer (e.g., a polyurethane seal) can be applied over such exterior surfaces to add further mechanical and/or ultraviolet light protection to the applique 18, particularly to any diffraction gratings 30 included in the exterior surfaces 34. Advantageously, the addition of a relatively thin protective coating can protect the diffraction gratings while retaining the benefits of locating the grating on the exterior surface 34 of the applique 18 in terms of diffraction efficiency and the overall iridescence obtained by the applique 18.

The over-mold 26 may define a plurality of diffraction gratings 30 disposed around the exterior surface 34. The over-mold 26 may define spaces between the diffraction gratings 30 which remain substantially transparent to ambient light and phosphorescent light from the substrate 22 (FIG. 2). The substantially transparent areas allow ambient light to penetrate the over-mold 26 to charge the phosphorescent material, and allow light emitted by the charged phosphorescent material to be emitted from the over-mold 26. Such an effect may be advantageous in providing colored light to an already iridescent image produced by the diffraction gratings 30. Further, each of the plurality of diffraction gratings 30 may have a different period, range of periods, and/or shape such that the iridescence of the applique 18 appears random and more jewel like.

According to another aspect of the disclosure, a method of making an iridescent member (e.g., applique 18) is provided that includes a step of forming a mold with mold surfaces corresponding to the components of the iridescent member (e.g., substrate 22 and the over-mold 26). In a first example, a single mold may be utilized which is capable of variable amounts of mold surface separation such that the substrate 22 and the over-mold 26 may be formed in different shots. In another example, the iridescent member may be formed in two different molds (e.g., a first mold to form the substrate 22 and a second mold to apply the over-mold 26 to the substrate 22). In either event, the mold is formed for this step from metals or metal alloys sufficient to withstand the temperatures and environmental conditions associated with injection molding the iridescent member or its components Next, the method of forming the iridescent member includes a step of ablating at least one of the mold surfaces to form one or more diffraction grating mold surfaces. For example, the ablating step is conducted to form one or more diffraction patterns (e.g., diffraction grating 30) on the mold surfaces intended to be incorporated in portions of the exterior of the iridescent member (e.g., applique 18). In a preferred example, the ablating step is conducted with a laser ablation process. Laser ablation processes, e.g., employing an AgieCharmilles Laser P cutting apparatus from Georg Fischer Ltd., are particularly adept at developing the diffraction pattern mold surfaces in the mold given their ability to precisely ablate microscopic features into metal and metal alloy mold surfaces. The diffraction grating may be formed in one or more patterns (e.g. the indicia 38) on the mold surface.

Referring again to the method of making the iridescent member, the method may also include a step of forming a component (e.g., the substrate 22) of the iridescent member (e.g., applique 18). The component may be formed according to known injection molding techniques employed by those skilled in the field.

Next, a step of over-molding a liquid polymer over the component may be performed. The over-molding liquid polymer may have a viscosity of less than about 2000 pa·s, less than about 1000 pa·s, or less than about 100 pa·s when over-molded onto the component such that the liquid polymer penetrates the diffraction grating. The diffraction pattern (e.g., diffraction grating 30) may have a thickness from 250 nm to 1000 nm and a period from 50 nm to 5 microns in the mold surface. Preferably, the forming the member step is conducted with an injection molding process. In a preferred aspect, portions of the mold in proximity to the one or more diffraction grating mold surfaces are heated prior to and/or during the step of over-molding the liquid polymer. Adding additional heat to these portions of the mold serves to further reduce the viscosity of the polymeric material such that it can flow within the very small scale aspects of the diffraction grating mold surfaces.

Finally, a step of solidifying the liquid polymer (e.g., to form the over-mold 26) over the component (e.g., substrate 22) is performed (e.g., such that the over-mold 26 defines the diffraction grating 30 in the exterior surface 34 of the over-mold 26).

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle having a vehicle applique in contact with a vehicle surface, the applique comprising:
    a polymeric substrate; and
    an over-mold positioned on the substrate, wherein the over-mold comprises a diffraction grating integral with the over-mold, the grating having a thickness from about 250 nm to 1000 nm and a period from 50 nm to 5 microns.

2. The vehicle of claim 1, wherein the over-mold comprises a silicone material.

3. The vehicle of claim 2, wherein the substrate comprises a phosphorescent material configured to emit light through the over-mold.

4. The vehicle of claim 1, wherein the diffraction grating defines an indicia.

5. The vehicle of claim 4, wherein the indicia includes at least one of text and a symbol.

6. The vehicle of claim 1, wherein the diffraction grating is defined on an exterior surface of the over-mold and the vehicle surface is an exterior surface.

7. The vehicle of claim 6, wherein the diffraction grating substantially covers the exterior surface of the over-mold.

8. The vehicle of claim 6, wherein the grating has a thickness from 500 nm to 750 nm and a period from 150 nm to 400 nm.

9. An iridescent vehicle applique, comprising:
    a polymeric substrate; and
    a translucent over-mold positioned over the substrate defining an exterior surface, the over-mold comprising silicone and defining at least one diffraction grating integrally defined on the exterior surface of the over-mold.

10. The applique of claim 9, wherein a period of the at least one diffraction grating varies across the diffraction grating.

11. The applique according to claim 9, wherein the period of the diffraction grating varies between two to five discrete values within the at least one diffraction grating.

12. The applique according to claim 9, wherein the applique is positioned on at least one of a trunk lid, rear quarter panel and door panel of a vehicle.

13. The applique according to claim 12, wherein the over-mold comprises a plurality of diffraction gratings, the diffraction gratings positioned in a spaced apart configuration.

14. The applique according to claim 13, wherein the polymeric substrate of the applique comprises phosphorescent material configured to emit light from the over-mold between the plurality of diffraction gratings.

15. A method of making an iridescent vehicular applique, comprising:
    forming a mold with mold surfaces;
    ablating at least one of the mold surfaces to form a diffraction grating mold surface;
    forming a substrate within the mold; and
    over-molding a liquid polymer over the substrate, wherein the liquid polymer penetrates the diffraction grating.

16. The method according to claim 15, further comprising the step:
    heating the diffraction grating mold surface prior to injection of the liquid polymer.

17. The method according to claim 15, further comprising the step:
    solidifying the liquid polymer to form an over-mold on the substrate, wherein the over-mold defines a diffraction grating in an exterior surface of the over-mold.

18. The method of claim 15, wherein the liquid polymer comprises a silicone material.

19. The method of claim 18, wherein the diffraction grating is shaped to form an indicia.

20. The method of claim 18, wherein the silicone material has viscosity of less than about 2000 pa·s when over-molded onto the substrate.

* * * * *